(12) United States Patent
Shenker et al.

(10) Patent No.: US 10,593,153 B2
(45) Date of Patent: Mar. 17, 2020

(54) SYSTEM AND METHOD FOR ALLOWING A CONSUMER TO PLAY A PLURALITY OF VIRTUAL INSTANT TICKETS THAT ARE LOADED INTO A MICROPROCESSOR AND THAT IS PHYSICALLY PROVIDED TO THE CONSUMER

(71) Applicant: Tapcentive, Inc., San Francisco, CA (US)

(72) Inventors: Gavin Shenker, Los Angeles, CA (US); David Wentker, San Francisco, CA (US); Mike Lindelsee, Redwood City, CA (US); Gabriel Wachob, San Mateo, CA (US); Kenneth E. Irwin, Jr., Dawsonville, GA (US)

(73) Assignee: Tapcentive, Inc., San Francisco, CA (US)

( * ) Notice: Subject to any disclaimer, the term of this patent is extended or adjusted under 35 U.S.C. 154(b) by 0 days.

(21) Appl. No.: 15/870,223

(22) Filed: Jan. 12, 2018

(65) Prior Publication Data
US 2018/0151026 A1    May 31, 2018

Related U.S. Application Data

(63) Continuation of application No. 15/284,449, filed on Oct. 3, 2016, now abandoned, which is a
(Continued)

(51) Int. Cl.
*G07F 17/32* (2006.01)
*G06Q 20/36* (2012.01)

(52) U.S. Cl.
CPC ....... *G07F 17/3241* (2013.01); *G06Q 20/367* (2013.01); *G07F 17/329* (2013.01);
(Continued)

(58) Field of Classification Search
CPC ...... G07F 17/32; G07F 17/3241; G06F 21/10; G06F 2221/2109; G06F 21/51;
(Continued)

(56) References Cited

U.S. PATENT DOCUMENTS 4,652,998 A * 3/1987 Koza ............... G06Q 50/34
                                                        273/274
4,817,951 A * 4/1989 Crouch ............ G07F 17/3244
                                                        273/143 R
(Continued)

FOREIGN PATENT DOCUMENTS

EP        1077437 A2    2/2001
JP      2002-150105 A   5/2002
(Continued)

OTHER PUBLICATIONS

Int'l Search Report dated Oct. 21, 2014 in Int'l Application No. PCT/US2014/046032.
(Continued)

*Primary Examiner* — William H McCulloch, Jr.
*Assistant Examiner* — Ankit B Doshi
(74) *Attorney, Agent, or Firm* — Panitch Schwarze Belisario & Nadel LLP

(57) ABSTRACT

A plurality of virtual instant tickets are loaded onto a memory of a microprocessor that is physically provided to the consumer. The consumer is physically given a small object, such as a bank card or hotel room key card that has the microprocessor embedded therein. The memory of the microprocessor includes a validation number of each virtual instant ticket, and the winning or losing outcome of each virtual instant ticket and the value of any winning outcome. A purchase is made to unlock a portion of the virtual instant tickets, thereby allowing that portion of tickets to be played. The consumer uses a computing device that interacts with
(Continued)

the microprocessor to play the tickets and informs the consumer of the outcome. Additional virtual instant tickets may be unlocked with subsequent purchases. The memory of the microprocessor is updated to indicate the one or more virtual instant tickets that were successfully played.

19 Claims, 8 Drawing Sheets

Related U.S. Application Data continuation-in-part of application No. 14/326,756, filed on Jul. 9, 2014, now Pat. No. 9,911,274.

(60) Provisional application No. 61/844,367, filed on Jul. 9, 2013.

(52) U.S. Cl.
CPC ...... *G07F 17/3218* (2013.01); *G07F 17/3223* (2013.01); *G07F 17/3225* (2013.01); *G07F 17/3244* (2013.01)

(58) Field of Classification Search
CPC ........... G06F 21/105; G06F 2221/0793; A63F 2300/401; A63F 13/12; A63F 13/71; A63F 13/73; A63F 13/95
See application file for complete search history.

(56) References Cited

U.S. PATENT DOCUMENTS

| | | | | |
|---|---|---|---|---|
| 5,324,035 | A * | 6/1994 | Morris | A63F 3/081 |
| | | | | 463/42 |
| 5,580,311 | A * | 12/1996 | Haste, III | A63F 3/0645 |
| | | | | 273/139 |
| 5,871,398 | A * | 2/1999 | Schneier | G07F 17/3218 |
| | | | | 463/16 |
| 7,515,718 | B2 | 4/2009 | Nguyen et al. | |
| 8,052,526 | B2 | 11/2011 | Abbott et al. | |
| 8,123,618 | B2 | 2/2012 | Karmarkar | |
| 8,469,790 | B1 | 6/2013 | Itkis et al. | |
| 8,764,566 | B2 | 7/2014 | Miltenberger et al. | |
| 2002/0142825 | A1 | 10/2002 | Lark et al. | |
| 2003/0003997 | A1 | 1/2003 | Vuong et al. | |
| 2003/0134675 | A1 | 7/2003 | Oberberger | |
| 2003/0139190 | A1 * | 7/2003 | Steelberg | G01S 5/02 |
| | | | | 455/456.1 |
| 2006/0094492 | A1 * | 5/2006 | Wolfe | G07F 17/32 |
| | | | | 463/17 |
| 2006/0100009 | A1 * | 5/2006 | Walker | G07F 17/32 |
| | | | | 463/25 |
| 2006/0111172 | A1 * | 5/2006 | Walker | G07F 17/32 |
| | | | | 463/16 |
| 2006/0166729 | A1 * | 7/2006 | Saffari | G07F 17/32 |
| | | | | 463/17 |
| 2007/0087817 | A1 | 4/2007 | Beer et al. | |
| 2007/0136817 | A1 | 6/2007 | Nguyen | |
| 2008/0132311 | A1 * | 6/2008 | Walker | G06Q 50/34 |
| | | | | 463/16 |
| 2008/0200225 | A1 | 8/2008 | Walker et al. | |
| 2010/0069136 | A1 * | 3/2010 | Safaei | G07F 17/32 |
| | | | | 463/17 |
| 2012/0259774 | A1 | 10/2012 | Marti | |
| 2014/0045568 | A1 | 2/2014 | Bennett, III et al. | |
| 2015/0006513 | A1 | 1/2015 | Mashimo | |
| 2015/0018080 | A1 | 1/2015 | Shenker et al. | |
| 2015/0050976 | A1 * | 2/2015 | Morin | G07F 17/329 |
| | | | | 463/17 |
| 2015/0356821 | A1 | 12/2015 | Entenmann et al. | |

FOREIGN PATENT DOCUMENTS

| | | |
|---|---|---|
| JP | 2003115001 A | 4/2003 |
| JP | 2003115002 A | 4/2003 |
| JP | 5119818 B2 | 1/2013 |
| KR | 20080069964 A | 7/2008 |
| KR | 101157541 B1 | 8/2012 |
| WO | 2015006513 A1 | 1/2015 |

OTHER PUBLICATIONS

Int'l Search Report dated Oct. 21, 2014 in Int'l Application No. PCT/US2014/046055.
Int'l Search Report and Written Opinion dated Nov. 22, 2017 in Int'l Application No. PCT/US2017/054726.
International Preliminary Report on Patentability dated Nov. 8, 2018 in International Application No. PCT/US2017/054726.
Written Opinion dated Aug. 6, 2018 in Int'l Application No. PCT/US2017/054726.
Int'l Search Report and Written Opinion dated Feb. 19, 2018 in Int'l Application No. PCT/US2017/054726.

* cited by examiner

300

Utilize a unique identifier to identify the secure gambling microprocessor.
310

Determine at least one game supported by an operating system of the mobile computing device.
320

Establish a secure communications channel between the gambling management system and the secure gambling microprocessor.
330

Transmit the at least one game to the secure gambling microprocessor via the secure communication channel.
340

FIG. 3

SYSTEM AND METHOD FOR ALLOWING A CONSUMER TO PLAY A PLURALITY OF VIRTUAL INSTANT TICKETS THAT ARE LOADED INTO A MICROPROCESSOR AND THAT IS PHYSICALLY PROVIDED TO THE CONSUMER

CROSS REFERENCE TO RELATED APPLICATION

This application is a continuation of copending U.S. application Ser. No. 15/284,449 filed Oct. 3, 2016, which in turn, is a continuation-in-part of copending U.S. application Ser. No. 14/326,756 filed on Jul. 9, 2014. Both of these applications are herein incorporated by reference in their entirety and priority is claimed to both of these applications.

This application also claims priority to U.S. Provisional Patent Application No. 61/844,367 filed Jul. 9, 2013, which is also incorporated herein by reference in its entirety.

BACKGROUND

Casino gaming, wagering, gambling and lottery operations are constantly changing and growing in markets around the world. Gambling operations are often carefully implemented and strictly regulated to ensure fairness of operations and to avoid fraud.

However, casino gaming and particularly lottery operations have gradually developed a static (aging) consumer base that is often sited as exploiting problem gamblers with various legislatures debating restrictions or probations being placed on casinos and lotteries. For example, "Stop Predatory Gambling", which advocates an end to state-sponsored gambling recently stated: "State lotteries have a business model that's based on getting up to 70% to 80% of their revenue from 10% of the people that use the lottery . . . " In Minnesota, a pending bipartisan bill would require 25% of lottery billboards to be dedicated to a warning about the odds of winning, cautions about addiction, and information on where problem gamblers can seek help.

In an attempt to diversify their base and increase sales, casinos and lotteries have come to appreciate the virtues of producing games with more entertainment value that can be sold at a premium price. For instance, ten-dollar instant lottery ticket games with higher paybacks and more ways to win now account for over $5 billion a year in United States lottery sales. But, these higher priced and high-volume games also typically add little unique entertainment value relative to lower priced instant tickets and consequently do not to attract many new consumers.

Thus, it is highly desirable to develop gaming systems methodologies that provide methods of playing new gaming opportunities, particularly more customized and interactive games. Ideally these gaming methodologies should allow for flexibility and creativity for game designers to tailor games to a wide variety of small targeted segments previously not served by existing gaming offerings, thereby appealing to a broader base of consumers.

Furthermore, it is also highly desirable to provide a gaming system that allows for secure, offline, gameplay so as to not require players to have or maintain a connection to the Internet in order to participate in gaming. Digital, interactive gaming solutions to date that are designed for personal devices such as phones, laptops and the like, require a constant connection to the Internet because all of the gaming routines reside in online servers. Gaming system providers to date have assumed that the only way to secure gaming systems in conjunction with personal computing devices is to implement all gaming software in server-based systems that include extensive physical and logical security protections.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3 is a flowchart of a set-up of a secure gambling microprocessor in accordance with an embodiment;

DESCRIPTION OF EMBODIMENTS

Figure 1:
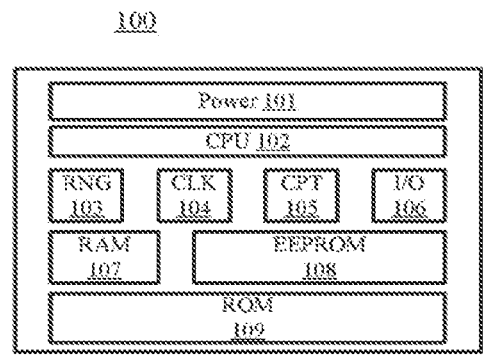
FIG. 1 is a block diagram of a secure gambling microprocessor in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "coupling", "accessing", "changing", "correlating" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

OVERVIEW

A distributed gaming system based on tamper resistant secure packages where remote network management of the secure package is provided to support changing gaming routines, purse management and reporting on gaming operations particular to this type of technology implementation is described.

For example, a system for gambling operations that include a central gambling management system and one or more consumer electronic devices that can serve as gambling devices for offline gaming. The consumer electronic devices are converted to gambling devices by including a tamper-resistant microprocessor having firmware with gambling code and a purse stored thereon, the tamper-resistant microprocessor running secure gaming software to govern all offline gaming-related routines and communications with the central gambling management system. Examples of computing devices include, but are not limited to, mobile phones, tablet computers, personal computers, home entertainment systems, etc. In the following discussion gambling refers to activities such as, but not limited to, Casino gaming, wagering, lottery operations and the like.

The system includes means for deploying the secure gambling microprocessor in a variety of form factors for use with the consumer electronic devices. Example secure gambling microprocessor form factors include, but are not limited to, smart cards, microSD cards, SIM cards, accessories connected via an input/output (I/O) port, and embedded microprocessors included within the devices. The system also includes means for activating a secure microprocessor, means for loading gaming routines to a secure microprocessor, means for modifying gaming routines in a secure microprocessor, means for securely linking a microprocessor to a specific consumer electronic device, means for establishing a user account in a secure microprocessor, means for loading value to a secure microprocessor, means for unloading value from a secure microprocessor, means for logging gaming results in a secure microprocessor, means for transferring gaming results from a secure microprocessor to the central gambling management system, and means for deactivating a secure microprocessor.

Figure 2:
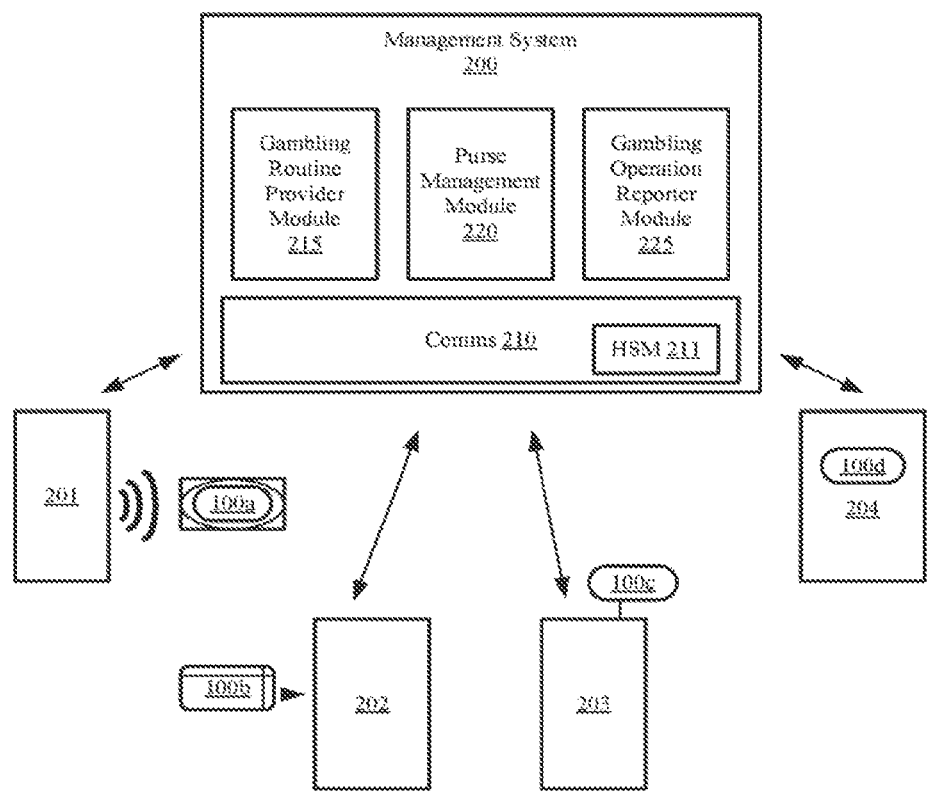
FIG. 2 is a block diagram illustrating the operable interconnections between a gambling management system, and at least one secure gambling microprocessor in accordance with an embodiment.

One embodiment involves a centrally managed gambling management system and one or more secure gaming engines deployed in a variety of form factors, and a typical consumer computing device that includes a graphic user interface (GUI) and specialized application software designed to interact with the secure gambling microprocessor and the gambling management system 200 (FIG. 2). The combination of secure gambling microprocessor and mobile device enables offline gaming as previously described. In one embodiment, the computing device may be a mobile device such as a laptop, tablet or phone; in another embodiment, the computing device may be a less mobile device such as desktop, tower, or the like. In one embodiment, the secure gambling microprocessor is embedded in a closed loop prepaid gift card issued by a state lottery or casino. In another embodiment, the secure gambling microprocessor is embedded in a hotel keycard that hotel guests use to gain access to their room and may also use the card for loyalty or real money gaming during a stay or after they leave a hotel property. In a preferred embodiment, the secure gambling microprocessor is embedded in a casino players' club card where prepaid funds are loaded onto the card for use with existing casino gaming systems such as slot machines and such funds can also be used to wager on games contained within the gambling microprocessor. In a preferred embodiment, the secure gambling microprocessor is embedded in an open loop prepaid debit or General Purpose Reloadable (GPR) card issued by a state lottery or casino and also branded by a payment association (e.g., Visa, MasterCard, Discover, American Express). The open loop embedded embodiment being preferred because both wagers and winnings may be paid for or loaded onto the associated card account.

With reference now to FIG. 1, a block diagram of an embodiment of a secure gambling microprocessor 100 is shown. One embodiment of secure gambling microprocessor 100 includes Power 101, a Central Processing Unit (CPU) 102, a Random Number Generator (RNG) 103, a connection for an external Clock 104, a Cryptographic Coprocessor (CPT) 105, an I/O port 106, Random Access Memory (RAM) 107, Electrically Erasable Programmable Read Only Memory (EEPROM) 108, and Read Only Memory (ROM) 109. The software for gaming operations can be stored and run from ROM 109 or EEPROM 108 and would rely on the support of the RNG 103 and CPT 105 for many of the operations.

In general, secure gambling microprocessor 100 is a dedicated computer on a chip or microprocessor for carrying out cryptographic operations, embedded in a packaging with multiple physical security measures, which give it a degree of tamper resistance. Although a number of secure microprocessors may be used herewith. In one embodiment, SmartMX designed by NXP is a microprocessor having data encryption capabilities.

I/O port 106 is a communications interface for secure gambling microprocessor 100 such as a contact interface according to ISO/IEC 7816, contactless interface according to ISO/IEC 14443A, serial input and output (half-duplex), USB, HDMI or other interfaces.

In one embodiment RNG 103 uses a cryptographic hash function to approach a uniform distribution of bits from a non-uniformly random source. In another embodiment, RNG 103 is a pseudo-RNG (PRNG) such as a Linear Congruential Generator (LCG) or Mersenner Twister. /dev/random is one example of a file that serves as a pseudorandom number generator.

In general, CPT 105 is implemented on a high-security, tamper resistant, programmable PCI board. Specialized cryptographic electronics, microprocessor, memory, and random number generator housed within a tamper-responding secure gambling microprocessor 100 provide a highly secure subsystem in which data processing and cryptography can be performed. In one embodiment, CPT 105 is a high-speed 3-DES coprocessor (64-bit parallel), a high-speed AES coprocessor (128-bit parallel), a PKI (RSA, ECC) coprocessor FameXE (32-bit parallel) such as found on a SmartMX by NXP. However, it should be appreciated that although the SmartMX is disclosed herein, the technology is well suited to using other comparable technologies.

In general, CPU 102 is hardware within a computer that carries out the instructions of a computer program by performing the basic arithmetical, logical, and input/output operations of the system. Two components of CPU 102 are the arithmetic logic unit for performing arithmetic and logical operations, and the control unit for extracting instructions from memory and decoding and executing them, calling on the arithmetic logic unit when necessary. CPU 102 may be multiprocessor, multi-core processors, and the like.

In one embodiment, the communication protocol to the microprocessor may be either ISO-7816 contact, ISO-14443 contactless, or both. Although a number of components are shown, it should be appreciated that secure gambling microprocessor 100 may include more or fewer components. Moreover, in an embodiment, the components described in secure gambling microprocessor 100 may be substituted for other components that provide similar operational capabilities. That is, there are many other options for implementations of the secure gambling microprocessor 100 that could involve other types of processors (micro or otherwise), modules, computing platforms or the like.

Gambling Management System 200

With reference now to FIG. 2, an embodiment of a gambling management system 200 is shown as part of a network accessible system that includes a human readable management interface such as a Web Browser (not shown in FIG. 2) used to set up and control gaming operations taking place in the secure gambling microprocessor 100 and associated mobile devices 201-204.

In one embodiment, FIG. 2 also includes a plurality of mobile computing devices 201-204, and a plurality of secure gambling microprocessors 100a-100d. In one embodiment, each of the plurality of secure gambling microprocessors 100a-100d are coupled with a different one of the plurality of mobile devices 201-204 to provide a plurality of secure stand-alone gambling platforms. As described in detail herein, gambling management system 200 is communicatively coupled with one or more of the plurality of secure stand-alone gambling platforms to maintain gambling integrity.

In one embodiment, gambling management system 200 includes a gambling routine provider module 215 that contains a number of gambling games such as poker, blackjack, and the like for a number of different user platforms. Gambling management system 200 also includes a purse management module 220 used to manage a purse or monetary amount, and a gambling operation reporter module 225 that is used to review gaming activity for fairness of operation and to avoid fraud. In one embodiment, gambling management system 200 also includes standard network data communications 210 interfaces (e.g., TCP/IP) to support communications with secure gambling microprocessor 100 and mobile devices 201-204.

In an alternative embodiment, gambling routine provider module 215 dispenses predetermined arrays of plays where the outcome (i.e., winning or losing status) of each game was determined in advance by a separate secure process. This embodiment has the advantage of utilizing external, possibly third party, gaming systems that have potentially already been approved by applicable regulator and government agencies, thereby reducing the requirements of detailed regulatory approval for network accessible system 200 and consequently expediting real world deployment. In a preferred embodiment, the dispensed predetermined array is compatible with lottery instant ticket shuffles and validation systems.

In one embodiment, gambling management system 200 will also include a dedicated security component such as a Hardware Security Module 211 (HSM) that is responsible for cryptographic key storage and operations in support of secure communication between the gambling management system 200 and the secure gambling microprocessor 100 and to secure the various management operations that are initiated within the gambling management system 200 and carried out in the secure gambling microprocessor 100. In one embodiment, the secure channel communication between the secure gambling microprocessor 100 and the gaming management system may be over a wired or wireless network. In another embodiment, the secure channel communication may be over a mobile network, or the like.

In one embodiment set up of secure gambling microprocessor 100 by the gambling management system 200 involves in part, the identification of which secure gambling microprocessor 100 will be used in the gaming operation, determining which games will be playable on secure gambling microprocessor 100, which game options will be supported on each, which mobile devices will be used in conjunction with each secure gambling microprocessor 100, and then activating the secure gambling microprocessor 100 by securely transmitting all associated gambling management data thereto.

In an embodiment, the secure gambling microprocessor 100 includes software operating in a tamper-resistant microprocessor. The microprocessors are capable of running multiple, secure, software applications. For example, in one embodiment the secure gambling microprocessor 100 software is responsible for all offline gaming routines including possible storage of predetermined winning and losing status on a game by game basis as well as secure communication with the gambling management system 200.

The security and integrity of the software operations in the microprocessor is maintained through cryptographic operations that take place within the tamper-resistant microprocessor. The security model for this invention relies on "end-to-end" security between the gambling management system 200 and secure gambling microprocessor 100 where the authenticity and integrity of all communication can be verified by either "end" (gambling management system 200 or secure gambling microprocessor 100). The data channel can also be encrypted end-to-end if required. This protection helps mitigate potential fraud involving the transmission of gambling management data to a secure gambling microprocessor 100 that was not created by the gambling management system 200 and similarly protects against fraud involving the transmission of gaming data from a secure gambling microprocessor 100 to the gambling management system 200 that did not originate from a secure gambling microprocessor 100. One embodiment, implements end-to-end communication security via cryptographic operations such as HSM 211, which provides a secure channel.

In one embodiment, non-secure functions related to the user interface are implemented outside of the secure gambling microprocessor 100. In this embodiment, mobile applications such as those that are designed for the Android or iOS operating systems 201 through 204 are used to create the user interface for gaming. The mobile applications then interact with the secure gambling microprocessor 100 via application programming interfaces. These application programming interfaces are also used for any communication between the mobile application and secure gambling microprocessor 100 as required to support communication of management data between the gambling management system 200 and secure gambling microprocessor 100 as described below.

With reference still to FIG. 2, a number of implementations between secure gambling microprocessor 100 and mobile devices are shown. For example, mobile device 201 illustrates an implementation in which secure gambling microprocessor 100a interacts with mobile device 201 via an ISO-14443 contactless interface and antenna. Mobile device 202 illustrates another implementation in which secure gambling microprocessor 100b is a component in a microSD package. Mobile device 203 provides yet another example implementation in which secure gambling microprocessor 100c utilizes an I/O port of the mobile device 203. For example, the I/O port may be an audio jack, USB (Universal Serial Bus) port, HDMI (High-Definition Multimedia Interface) port, or the like which acts as the communications interface between mobile device 203 and secure gambling microprocessor 100c. Mobile device 204 illustrates yet another embodiment wherein the secure gambling microprocessor 100d is an embedded microprocessor such as a SIM (Subscriber Identity Module) card or chip integrated as a part of the mobile device 204 circuitry.

Contactless Communication Secure Gambling Microprocessor

In one embodiment, secure gambling microprocessor 100a in combination with mobile device 201 illustrates an implementation where the secure gambling microprocessor 100a communicates via contactless with mobile device 201. For example, in one embodiment secure gambling microprocessor 100a includes an integrated ISO-14443 contactless communications interface and antenna, or the like. As such, secure gambling microprocessor 100a is capable of communication with a mobile device 201 or other device that supports ISO-14443, Near Field Communication (NFC) protocols, Bluetooth, or the like.

In operation, mobile device 201 is used to transmit gambling management data from the gambling management system 200 to secure gambling microprocessor 100a by first transmitting the data to a mobile application on the mobile device 201 via the mobile device's Cellular or Wi-Fi radio communications interface. The mobile device 201 then uses its NFC communications interface to transmit the data to secure gambling microprocessor 100a.

In general, the user interface for gaming is implemented as a mobile application. In this particular example, the mobile device could be a mobile phone, tablet computer, laptop computer, notebook computer, personal digital assistant, or the like. For example, mobile device 201 may be running an operating system that includes support for NFC. In one embodiment, gaming takes place by executing the mobile application and ensuring that the secure gambling microprocessor 100a is in proximity to mobile device 201 to support communication between mobile device 201 and secure gambling microprocessor 100a via the NFC to ISO-14443 interfaces. In a preferred embodiment, the secure gambling microprocessor 100a is embedded in a plastic card (e.g., debit card or GPR card), proximity communicating with mobile device 201 via NFC.

Insertable Secure Gambling Microprocessor

In one embodiment, secure gambling microprocessor 100b in combination with mobile device 202 illustrates an implementation where the secure gambling microprocessor 100b is a tamper-resistant microprocessor in an insertable package such as, a microSD package. In one embodiment, secure gambling microprocessor 100b is inserted into the mobile device's microSD slot. Once in the slot, the I/O interface of the secure gambling microprocessor 100 uses the contact interface of the microSD card to communicate with the mobile device.

In operation, mobile device 202 is used to transmit gambling management data from the gambling management system 200 to secure gambling microprocessor 100b by first transmitting the data to a mobile application on mobile device 202 via the mobile device's cellular or Wi-Fi radio communications interface. Mobile device 202 then uses its microSD interface to transmit the data to secure gambling microprocessor 100b.

In one embodiment, the user interface for gaming is implemented as a mobile application. In this example, mobile device 202 could be a tablet computer, mobile phone or the like running an operating system that includes support for a microSD card. Gaming takes place by executing the mobile application on mobile device 202 that then interacts with secure gambling microprocessor 100b via the microSD communications interface.

I/O Port Secure Gambling Microprocessor

In one embodiment, secure gambling microprocessor 100c in combination with mobile device 203 illustrates an implementation that involves the packaging of a tamper-resistant secure gambling microprocessor 100c in an accessory device that can then be inserted into a mobile device 203 I/O port. This accessory device includes circuitry that enables communication between secure gambling microprocessor 100c I/O port and mobile device 203, using the I/O interface. As described herein, the I/O port may be an audio jack, an HDMI jack, a USB jack or other communications port.

In operation, mobile device 203 is used to transmit gambling management data from the gambling management system 200 to secure gambling microprocessor 100c by first transmitting the data to a mobile application on mobile device 203 via the mobile device's cellular or Wi-Fi radio communications interface. The mobile device then uses the mobile device's I/O port interface to transmit the data to secure gambling microprocessor 100c.

In one embodiment, the user interface for gaming is implemented as a mobile application. In this particular example, mobile device 203 could be a tablet computer, mobile phone or the like, running an operating system that includes support for an I/O port accessory. Gaming takes place by executing the mobile application on mobile device 203 that then interacts with secure gambling microprocessor 100c via the I/O port.

Fixedly Integrated Secure Gambling Microprocessor

In one embodiment, secure gambling microprocessor 100d in combination with mobile device 204 illustrates yet another implementation that involves more permanent integration of secure gambling microprocessor 100d in mobile device 204 in comparison with the previous examples. Examples of this implementation include use of the tamper-resistant Subscriber Identity Module (SIM) of a mobile device to host the secure gambling microprocessor 100 software. Another variation of this implementation could involve hosting of the secure gambling microprocessor 100 software in a tamper-resistant microprocessor that is included as a part of the main circuitry of mobile device 204.

In operation, mobile device 204 is used to transmit gambling management data from the gambling management system 200 to secure gambling microprocessor 100d by first transmitting the data to a mobile application on mobile device 204 via the mobile device's cellular or Wi-Fi radio communications interface. The mobile application then uses application programming interfaces to transmit the data to secure gambling microprocessor 100d.

In one embodiment, the user interface for gaming is implemented as a mobile application. In this example, mobile device 204 could be a tablet computer, mobile phone, laptop, or the like running an operating system where the device includes a tamper-resistant microprocessor in the form of a SIM or other embedded component. Gaming takes place by executing the mobile application on mobile device 204 that then interacting with secure gambling microprocessor 100d via application programming interfaces to secure gambling microprocessor 100d.

Although a number of iterations of secure gambling microprocessors are described. It should be noted that secure gambling microprocessor 100 could be built as a standalone system in many form factors such as paper-type advertisements for a magazine, newspaper, poster, etc. Secure gambling microprocessor 100 could also be contained within items such as a key fob, plastic card (e.g., debit or credit), etc. In another embodiment, secure gambling microprocessor 100 could also be electronically integrated within larger systems such as a digital billboard system, home entertainment system, home appliance, automobile, kiosk, etc. For examples, secure gambling microprocessor 100 may be implemented in a fashion similar to secure gambling microprocessor 100d where secure gambling microprocessor 100 is integrated within a larger system that is typically responsible for data communications and can support the data communication needs of secure gambling microprocessor 100 to the gambling management system 200 and can also provide a user interface for gaming applications.

Mobile Device

In one embodiment, the mobile device 201-204 utilizes mobile operating systems such as, but not limited to, Android, iOS, Windows Phone, RIM Blackberry OS, and the like. It should also be noted that the present invention is platform and device independent. Data communication between the mobile device and gambling management system 200 is accomplished via the integrated cellular and/or Wi-Fi radios of the mobile device.

However, communication between mobile device and secure gambling microprocessor 100 depends upon the type of secure gambling microprocessor package. For example, secure gambling microprocessor 100a will utilize an NFC capability in the mobile device, while communication between a mobile device and secure gambling microprocessor 100b-100d would take place via an application-programming interface of the secure gambling microprocessor and application software running within the mobile device. Although NFC, Wi-Fi, and Cellular radio communication are all cited as examples, any other communications interface capable of transmitting the desired data between the subsystems may be utilized.

Gaming Setup and Management

Reference will now be made to FIG. 3, a flowchart 300 of a method of setting-up secure gambling microprocessor 100 in accordance with an embodiment.

With reference now to 310 of FIG. 3 and FIG. 2, one embodiment utilizes a unique identifier to identify the secure gambling microprocessor 100. For example, each secure gambling microprocessor 100 will be identified by a unique identifier such as a serial number or the like that allows the gambling management system 200 to correctly and securely communicate with each secure gambling microprocessor 100. In one embodiment, the unique identifier is automatically determined by secure gambling microprocessor 100 or gambling management system 200. In another embodiment a Casino operator interacts with the management interface of the gambling management system 200 to provide the unique identifier of secure gambling microprocessor 100.

Referring now to 320 of FIG. 3 and FIG. 2, one embodiment determines at least one game supported by the operating system of the mobile computing device. In one embodiment, the determination is performed by the gambling management system 200. In another embodiment, the determination is performed by a user such as the Casino or Lottery operator.

With reference now to 330 of FIG. 3 and FIG. 2, one embodiment establishes a communication channel between secure gambling microprocessor 100 and the gambling management system 200 via the computing device. For example, the gambling management system 200 uses secure gambling microprocessor 100 identifiers and internal systems such as the hardware security module 211 to set up Secure Channel communication between the gambling management system 200 and secure gambling microprocessor 100.

With reference now to 340 of FIG. 3 and FIG. 2, one embodiment transmits the at least one game to secure gambling microprocessor 100 via the secure communication channel. For example, the gambling management system 200 transmits all required software and settings to each secure gambling microprocessor 100 and sets the state of those secure gambling microprocessor 100 to active.

In general, there is a wide range of variations on how much or how little software and data is transmitted to the secure gambling microprocessor 100. For example, in one embodiment, all gaming software could be loaded to the secure gambling microprocessor 100 during the data transmission. Alternatively, no gaming software is transmitted as it has been previously loaded via some other process such as during the production and distribution of the tamper-resistant microprocessors hosting the secure gambling microprocessor 100 software. In either of these two examples, predetermined arrays of plays where the outcome (i.e., winning or losing status) of each game was determined in advance by a separate secure process could also be loaded into the secure gambling microprocessor 100. This embodiment has the advantage of utilizing external, possibly third party, gaming systems that have potentially already been approved by applicable regulator and government agencies, thereby reducing the requirements of detailed regulatory approval and consequently expediting real world deployment. In a preferred embodiment, the dispensed predetermined array is compatible with lottery instant ticket shuffles and validation systems.

Customer Account Setup

Figure 4:
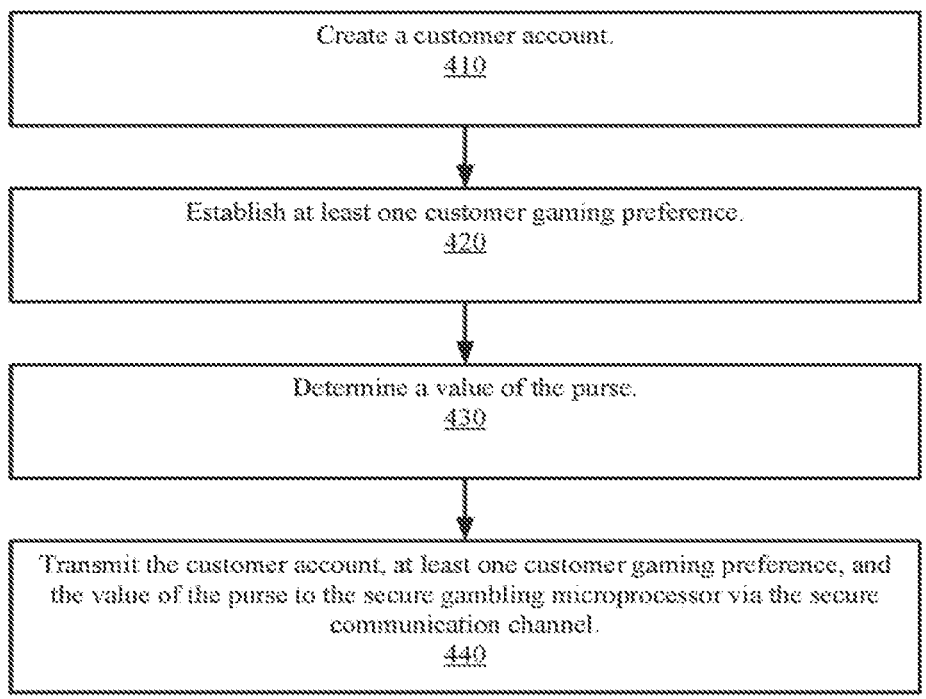
FIG. 4 is a flowchart of the set-up of a Customer account in the gambling management system and a secure gambling microprocessor in accordance with an embodiment.

Reference will now be made to FIG. 4, a flowchart 400 of a method of establishing a customer account for the system in FIG. 2. In general, flowchart 400 may be utilized in a stand-alone format or may be used after the flowchart 300 described in FIG. 3.

Referring now to 410 of FIG. 4 and FIG. 2, one embodiment creates a customer account based on the unique identifier of secure gambling microprocessor 100. In one embodiment, the customer account is automatically created by gambling management system 200. In another embodiment, a Casino operator interacts with the management interface of the gambling management system 200 to create the customer account.

With reference now to 420 of FIG. 4 and FIG. 2, one embodiment establishes at least one customer gaming preference. For example, the customer gaming preference includes specifying what games (e.g., poker, blackjack, slots) and game preferences (e.g., payout table for poker, game theme) the Customer chooses, and the like. In a preferred embodiment, the gaming preference such as a theme can vary by unique batches of secure microprocessors to support marketing arrangements. For example, a state lottery may allow individual retailers to include some unique branding in the user interface application of the game as implemented in a mobile application such as an Android application. In such an embodiment, a single Android application user interface could dynamically change branding themes based on preferences set in individual gambling microprocessors during the process described in 420. To illustrate this example, a state lottery may issue secure gambling microprocessors to two different retailers (retailer A and retailer B) for sale within the state. Secure gambling microprocessors for retailer A include a branded theme preference specific to retailer A. Likewise, secure gambling microprocessors for retailer B include a branded theme preference specific to retailer B. The state offers a single Android application to provide a Graphical User Interface (GUI) for interacting with the secure gambling microprocessors. When players use the Android application with secure gambling microprocessors sold by retailer A, the Android application reads the game theme preference from the secure gambling microprocessors and displays in the GUI some branding specific to retailer A. Similarly, when players use the same Android application with secure gambling microprocessors sold by retailer B, the Android application reads the game theme preference from the secure gambling microprocessors and displays in the GUI some branding specific to retailer B.

With reference now to 430 of FIG. 4 and FIG. 2, one embodiment determines a value of the purse. That is, how much value the Customer wishes to load to secure gambling microprocessor 100 for gambling, and which secure gambling microprocessor 100 will be used by the Customer.

With reference now to 440 of FIG. 4 and FIG. 2, one embodiment transmits the customer account, the at least one customer gaming preference, and the value of the purse to secure gambling microprocessor 100 via the secure communication channel HSM 111.

In one embodiment, in order to transmit the information, a secure channel is established. In one embodiment the secure channel includes secure communications between secure gambling microprocessor 100 and mobile device 201 with which it will be used. An example of this linking process would be to use some unique identifier from the mobile device 201, such as a Message Authentication Code (MAC) Address or the like, to ensure that the secure gambling microprocessor 100 is only used in conjunction with that specific mobile device.

Once the secure communications is established between secure gambling microprocessor 100 and mobile device 102, gambling management system 200 uses secure gambling microprocessor 100 identifiers and internal systems such as the hardware security module 211 to set up secure channel communication between the gambling management system 200 and secure gambling microprocessor 100. In one embodiment, the secure channel is automatically established by gambling management system 200. In another embodiment a Casino or Lottery operator interacts with the management interface of the gambling management system 200 to establish the secure channel.

Once the secure channel is established, gambling management system 200 transmits all required account data, game settings, link information for the mobile device, optionally arrays of plays with predetermined outcomes, and value to secure gambling microprocessor 100. At this point the secure gambling microprocessor 100 can be used with its associated mobile device and mobile application for gaming in a distributed manner. That is, secure gambling microprocessor 100 will allow a user to gamble on the associated mobile device until the purse is empty without requiring the user to access gambling management system 200. In one embodiment, secure gambling microprocessor 100 does not need to contact gambling management system 200 again until the purse needs to be reloaded, a different game is selected by the user, or the user wishes to cash out.

Example Operation

The following is an example of an operation distributed gaming system based on tamper resistant secure packages where remote network management of the secure package is provided to support changing gaming routines, purse management and reporting on gaming operations particular to this type of technology implementation.

In other words, a person can receive a secure gambling microprocessor 100 with a gambling game thereon. The user can couple secure gambling microprocessor 100 with a computing device that includes a Graphic User Interface (GUI).

For example, a user wishes to play blackjack for real money. The user would order a blackjack secure gambling microprocessor 100. When ordering the blackjack secure gambling microprocessor 100, the user will have a number of choices, including, but not limited to, purchasing a blackjack secure gambling microprocessor 100 with a pre-loaded purse having a pre-defined monetary amount loaded thereon, selecting a free blackjack secure gambling microprocessor 100 with an empty purse, selecting a free blackjack secure gambling microprocessor 100 with a few introductory dollars in the purse, etc.

In one embodiment, if the user has ordered a blackjack secure gambling microprocessor 100 with a preloaded purse, once the secure gambling microprocessor 100 was communicatively coupled with the computing device, the user would be able to begin playing blackjack. In one embodiment, the blackjack secure gambling microprocessor 100 would not need to communicate with gambling management system 200 prior to the user using the secure gambling microprocessor 100 to gamble.

However, if the user selected a blackjack secure gambling microprocessor 100 with an empty purse, or ran out of money in the pre-loaded purse, the user would utilize the computing device to initiate secure communications between gambling management system 200 and the blackjack secure gambling microprocessor 100. During the communications, gambling management system 200 would also be able to perform a number of diagnostics and evaluations, including, but not limited to, providing updates to at least a portion of the secure gambling microprocessor 100; ensuring the security of the secure gambling microprocessor 100; determining the monetary value of the purse; and authorizing transfer of additional funds from a user authorized account; e.g., a bank account, to the purse on the blackjack secure gambling microprocessor 100.

Once the gaming management system had loaded or reloaded the purse in the blackjack secure gambling microprocessor 100, the user would be able to again play blackjack. Moreover, as described above, once the purse had a value and secure gambling microprocessor 100 is securely communicatively coupled with the computing device, the user would be able to gamble without having to maintain any connection with gambling management system 200. In one embodiment, the user could continue to gamble without communicating with gambling management system 200 until the user's purse was empty or the user wanted to cash out.

In an additional example, the user may be tired of playing blackjack or otherwise want to play a different game. In this case, the user will access gambling management system 200 via the secure channel and request gambling management system 200 to add poker (or the like) to the secure gambling microprocessor 100. In one embodiment, gambling management system 200 will add the poker game to the secure gambling microprocessor 100 and the secure gambling microprocessor 100 will have both poker and blackjack. In another embodiment, gambling management system 200 will remove the blackjack game when the poker game is added. In yet another embodiment, gambling management system 200 may offer the user a set of games that can be added to the secure gambling microprocessor 100, or the user may select any number of games from a list of available games.

In another embodiment, gambling management system 200 may contact the user with an offer to provide a new or different game to the user's secure gambling microprocessor 100. In addition, periodic communication may occur between the secure gambling microprocessor and the gambling management system via the communication channel. In general, the periodic communication may include providing updates to at least a portion of the secure gambling microprocessor 100, monitoring a security of the secure gambling microprocessor 100; and determining a monetary value of the purse.

In general, when the games are added or changed, gambling management system 200 will not modify the purse value on the secure gambling microprocessor 100. Thus, if a user had 100 dollars in her purse when she decided to add a poker game to secure gambling microprocessor 100, she would have 100 dollars in her purse after the poker game was added, regardless of whether any other games were removed or not.

In another embodiment, secure gambling microprocessor 100 functions only as a game starting seed(s) generator wherein actual game play simulation and interaction is conducted by non-secure software resident on the connected computing device. In this embodiment game type selection (e.g., blackjack, poker, craps) and play is executed on the connected computing device with the starting seed(s) determining ultimately how much (if any) money is won. This embodiment has the advantage of a potentially richer gaming environment due to presumably greater memory and process capabilities resident on the connected computing device in contrast to the relatively limited resources available on the secure gambling microprocessor 100 while still maintaining security against fraudulent alteration of the connected computing device's software. Since the seed(s) that determine the game outcome are generated by the secure gambling microprocessor 100, an auditable trial is maintained of the intended game outcome that can be verified by the gambling management system 200 independent of the connected computing device. Additionally, by offloading actual game play and associated functionality to the connected computing device memory is freed in the secure gambling microprocessor 100 for storing potentially large predetermined arrays of plays where the outcome of each game was determined in advance.

Before describing how this independence is enabled by this embodiment, it may be useful to first provide a brief description of the current state of the art of instant ticket production and validation. The concept is to ensure that a common lexicon is established of existing legacy systems prior to describing the present invention. This description of legacy instant ticket production and validation is provided in the discussion of FIG. 4A.

Figure 4A:
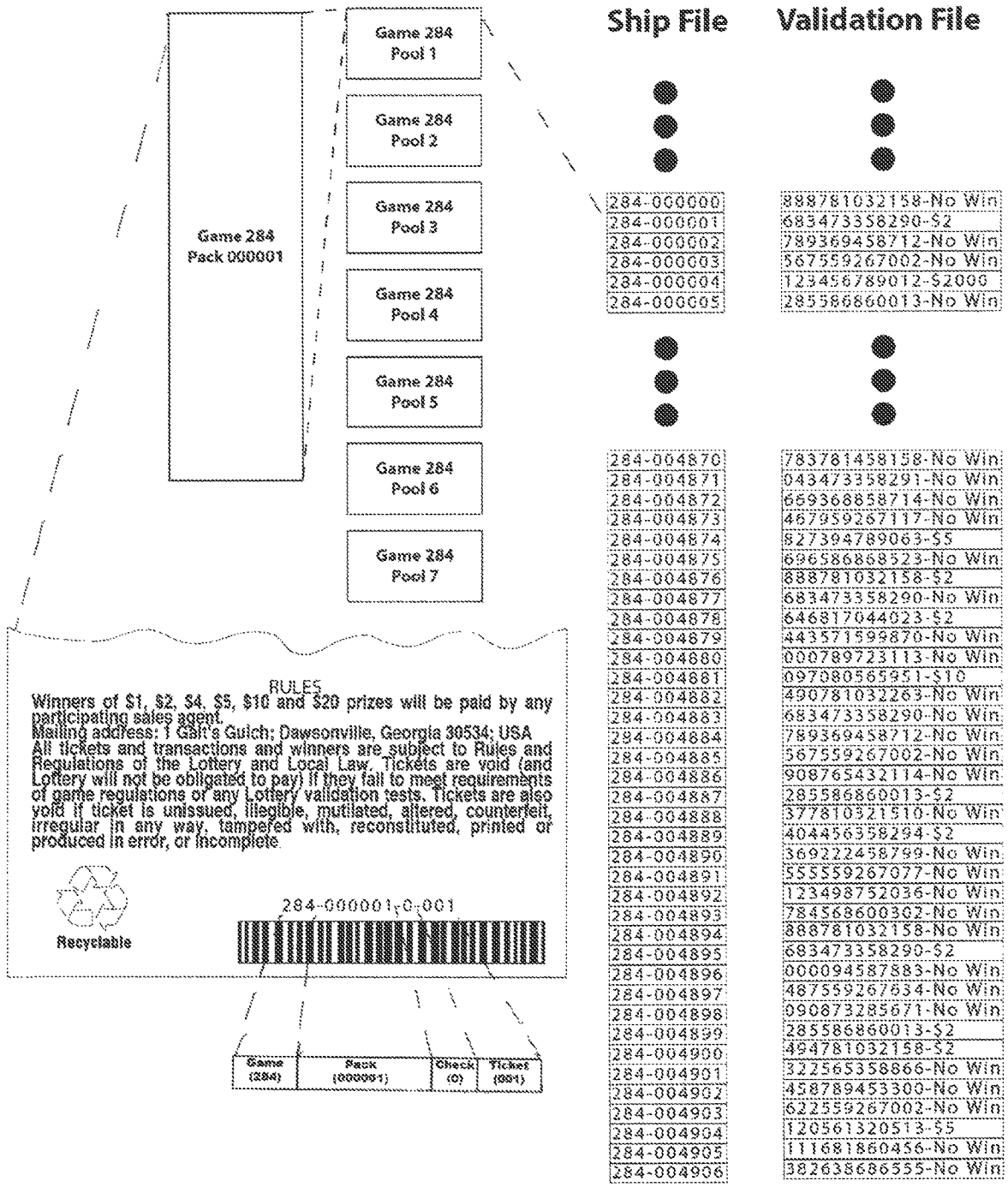
FIG. 4A is a block diagram of a representative example of traditional, prior art lottery-type instant ticket games as logistically arranged with respect to existing lottery activation and validation systems.

FIG. 4A depicts a representative example of the variable human readable inventory control number 452 and the associated barcode 453 on the back 451 of a traditional printed lottery-type instant ticket. As shown in FIG. 4A, the variable printed human readable inventory control number and the associated barcode are imaged on the ticket back 451 and therefore accessible (by design) to the retailer prior to purchase of the ticket. Also presented in FIG. 4A is a taxonomy of a typical instant ticket's human readable inventory control number's 452 and 453 data: starting with a three or four decimal digit game number 454 identifying the game, followed by a variable length pack number 455 (six decimal digits as shown in FIG. 4A), a one or two digit modulo check number 456, and a variable digit ticket number 457 (three decimal digits as shown in FIG. 4A) uniquely identifying the ticket in a pack. The taxonomy of the instant ticket's barcode 453 data is similar to the human readable inventory control number 452 with the barcode 453 and human readable images embodying identical inventory control data 454 through 457; however, the barcode 453 can embody other data in addition to the inventory control data.

As previously stated, the instant ticket inventory control data 454 through 457 typically found on the back 451 of a lottery ticket is accessible via human readable inventory control number 452 and barcode 453 to the retailer and others prior to purchase and play of the ticket. This is because, as its name implies, the instant ticket inventory control data 454 through 457 embodied as human readable inventory control number 452 and barcode 453 indicia are used for tracking the individual ticket through its life cycle of production, warehouse storage, shipping, pack activation by the retailer, sale, and redemption. Therefore, for security reasons against retailer pick-out, there is no cleartext win or lose information embedded in the instant ticket human readable number 452 or machine-readable barcode 453. However, in some embodiments, win or lose validation information is included in the machine-readable barcode 453, but this information is always encoded as ciphertext and never accessible in cleartext from an unplayed ticket.

At the system level 450 logistical tracking, activation, and validation of lottery-type instant tickets 451 is accomplished by grouping tickets together in packs 458. The number of tickets per pack will vary depending on the game and ticket retail value, but all tickets 451 in a pack 458 will have sequential inventory control numbers 452 and 453. There are several reasons for arranging lottery-type instant tickets in packs, a primary reason is that instant tickets 451 are ordered and shipped in packs 458 with the pack 458 being the fundamental unit of reconciliation. Since instant tickets 451 are shipped in packs 458, the pack 458 is also the fundamental unit of activation on the overall instant ticket system 451—i.e., there is typically no individual (ticket) level of activation, the smallest quantization of activation on a typical instant ticket system 450 is at the pack 458 level. Thus, when a retailer receives a new pack of tickets 458, he or she must first activate the pack 458 on the system 450 before placing the tickets on sale. Pack 458 level activation thereby enables instant tickets to be shipped via common carrier since un-activated or stolen packs 458 would be automatically flagged on the system 450 with any tickets 451 in the pack 458 flagged when redemption was attempted.

In addition to shipping, reconciliation and activation, some games may be structured such that there are a specified minimum number and/or types of winners within a pack 458. In these embodiments, the arrangement of winning tickets is not truly random, but are randomly distributed within a defined structure to ensure that all retailers receive approximately the same number of low- and mid-tier winners per pack as well as to aid in ensuring sufficient cash is on hand for paying low- and mid-tier prizes.

A given number of packs 458 are then arranged on the system 450 as a pool 459. The purpose of a pool 459 is to reconcile all low- and mid-tier (and possibly high-tier) prizes into a predetermined prize structure. While the size of a pool 459 can vary from game-to-game it is essential that a pool 459 be sufficiently large to inhibit tracking unsold winning tickets by the public.

All of the produced packs 458 for a given game are logged in a digital ship file 460 by the ticket manufacturer and loaded on the system 450 prior to the game being placed on sale. The ship file contains a listing of all the manufactured packs 458 identifying (typically by omission) any pack 458 numbers that were destroyed in the manufacturing process. As a game is placed on sale the ship file is routinely expanded with information such as: "pack 'X' shipped to retailer 'Y', "pack 'X' activated," "pack 'X' stolen," etc. Thus, the ship file enables logistical tracking of all manufactured packs 458 in an instant ticket game; however, the ship file 460 does not contain any win or lose information and cannot be linked (without appropriate cryptographic seeds or keys) to the validation file 461.

The validation file 461 contains the validation codes (not shown in FIG. 4A) for all tickets within a game with the validation codes effectively providing pointers to the prize value (if any) of a ticket 451 on the system 450. The validation code is effectively inaccessible on unplayed or unsold tickets due to it being covered by a scratch-off coating. Thus, the cleartext validation code is inaccessible on unplayed or unsold tickets 451. Therefore, the security of the system 450 is derived from the validation file 461 being unassociated with the ship file 460, as well as the physical unplayed tickets' inventory control information 452 and 453.

Both the ship 460 file and the validation file 461 are generated by the instant ticket manufacturer before the tickets are shipped to the lottery. All lottery logistical and validation systems 450 currently require the ship file 460 and validation file 461 to be loaded on the system 450 prior to instant tickets being shipped to retailers and placed on sale. Once loaded onto the system 450, the basic validation file 461 typically cannot be altered (other than possibly flagged additions—e.g., redeemed, stolen, etc.), thereby ensuring the integrity of the instant ticket game and its predetermined payout.

Figure 4B:
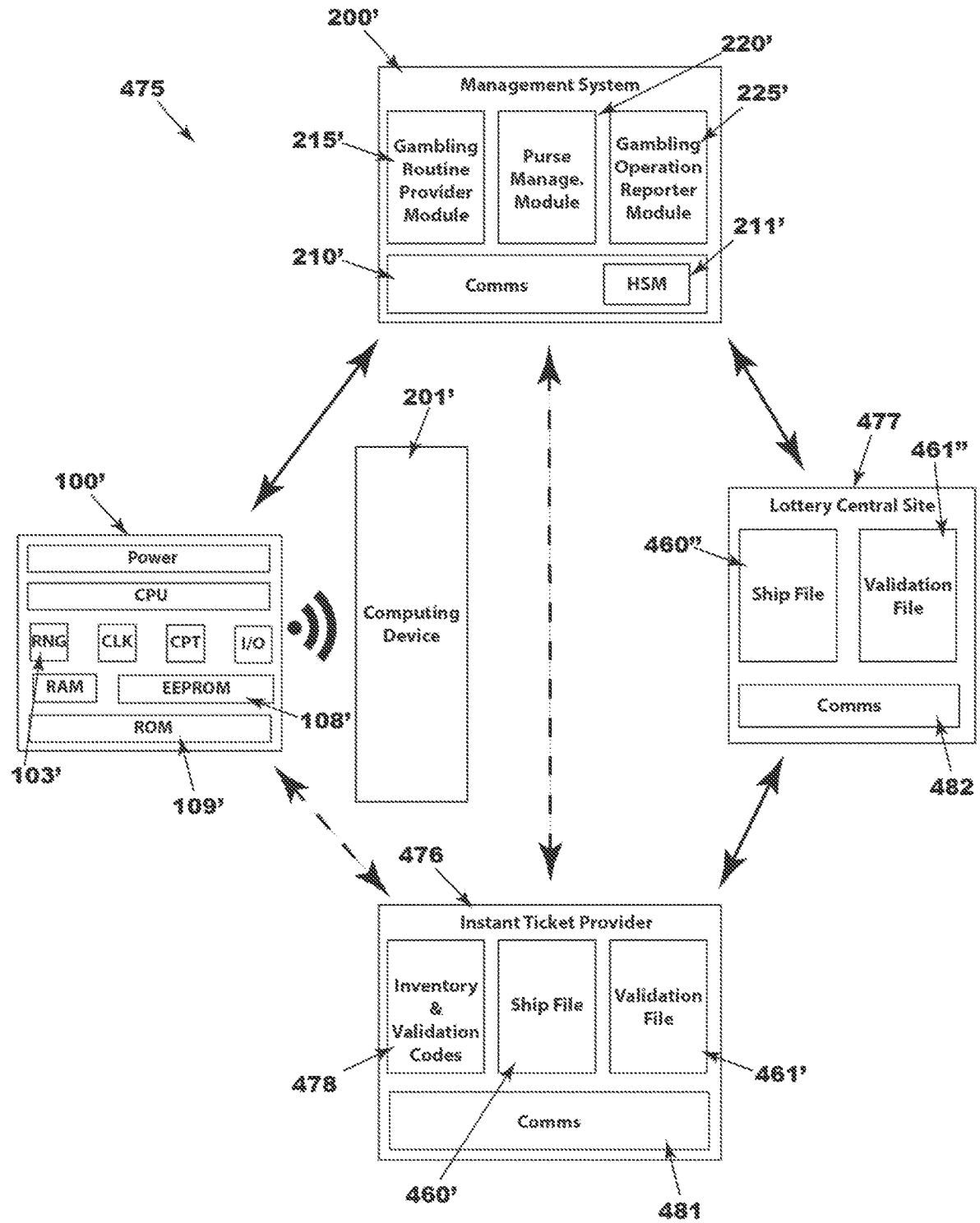
FIG. 4B is a block diagram providing a schematic graphical overview of a general embodiment as applied to segregating predetermined output arrays within the secure gambling microprocessor of FIG. 1 in accordance with an embodiment.

An embodiment 475 of the present invention for reliably and securely storing large numbers of predetermined winning and losing game outcomes within the secure gambling microprocessor 100' that is compatible with legacy lottery instant ticket validation systems 450 is provided in FIG. 4B. As shown in FIG. 4B, the secure gambling microprocessor 100' is, as before, networked with game management system 200' via its associated computing device 201'. However, in this example embodiment 475 the secure gambling microprocessor 100' is also networked to a legacy lottery central site validation system 477 as well as a lottery instant ticket provider 476 via their communications (Comms) systems (482 and 481, respectively) to the management system's 200' Comms 210'.

This example embodiment 475 has the advantage of being compatible with existing instant ticket lottery validation 477 and production 476 systems and therefore can conduct validations and redemptions on said legacy lottery systems without the need for an external banking or purse system 220'. In this embodiment, instant ticket 451 inventory control (454 through 457—FIG. 4A) and validation information is loaded from the lottery instant ticket provider's 476 (FIG. 4B) generated inventory & validation codes 478 are downloaded into secure gambling microprocessor's 100' Electronically Erasable Programmable Read Only Memory (EEPROM) 108' thereby enabling secure gambling microprocessor's 100' to communicate with its associated computing device 201' such that the consumer can play a game that will ultimately culminate in the prize value (if any) pre-assigned to the loaded instant ticket 451 (FIG. 4A) by the instant ticket provider 476 (FIG. 4B) at the time of instant ticket game generation 478 that will validate for the same prize value on the lottery central site 477.

The instant ticket 451 (FIG. 4A) inventory control (454 through 457) and validation information can be loaded into the secure gambling microprocessor's 100' (FIG. 4B) EEPROM 108' or Read Only Memory (ROM) 109' at the time of manufacture. Alternatively and preferably, instant ticket data may be loaded into the secure gambling microprocessor's 100' EEPROM 108' via the management system 200' and associated computing device 201'. The preferred embodiment, having the advantages of flexible instant ticket game play as well as allowing the consumer to repeatedly purchase multiple virtual instant tickets.

As was discussed in FIG. 4A, instant tickets 451 are logistically grouped in packs 458 that are units of activation on legacy lottery instant ticket systems. Multiplicities of packs 458 are then grouped into pools 459 primarily for the purpose of prize fund balancing. In a preferred embodiment, virtual instant ticket packs 458 rather than virtual individual instant tickets 451 are loaded onto the secure gambling microprocessor's 100' (FIG. 4B) EEPROM 108' or ROM 109' at either the time of manufacturer or via the network enabled by the associated computing device 201' and the management system 200'. By loading virtual packs 458 rather than virtual individual instant tickets 451, the secure gambling microprocessor 100' may execute multiplicities of game plays and corresponding prize awards without the need for further downloads. Virtual packs 458 may be paid for in entirety or preferably the virtual pack represents the theoretical retail value of the plays loaded the secure gambling microprocessor 100' with the consumer purchasing and thereby unlocking each virtual instant ticket 451 at different times. In this embodiment, the consumer may not purchase all of the virtual instant tickets 451 within a virtual pack 458. However, since the packs 458 and tickets 451 exist in a virtual embodiment there is for all practical matters no cost associated with downloading virtual instant tickets 451 that may never be played. In fact, if the secure gambling microprocessor's 100' EEPROM 108' is sufficiently large, virtual pools 459 comprising multiplicities of packs 458 and tickets 451 may be loaded. This embodiment has the advantages of fewer communications downloads as well as the possible consumer psychological benefit of being able to advertise that every secure gambling microprocessor 100' is carrying or embodying the top prize.

Virtual packs 458 or pools 459 being downloaded to the secure gambling microprocessor 100' does have the disadvantage of a potential security vulnerability assuming an insider gained access to the prizes awarded for a given pack or pool. The security vulnerability being realized by an insider with knowledge of the sequence of the winning and losing virtual tickets 451 in a pack 458 or pool 459 possibly gaining an illicit advantage by developing an exit strategy for each secure gambling microprocessor 100'—i.e., determining the optimum time to stop playing when total winnings maximally exceed the total value paid for virtual tickets 451 purchased. While various countermeasures are typically employed with real world instant ticket validation systems 477 to avoid this situation, the problem remains as a theoretical security flaw. Fortunately, in a preferred embodiment, downloaded virtual packs 458 or pools 459 of virtual instant tickets 451 may be shuffled within the secure gambling microprocessor 100' using the internal RNG 103' such that the play sequence of the virtual tickets 451 within a pack 458 or pool 459 would be unknown. In this embodiment, the RNG 103' would rearrange the stack of virtual tickets 451 within a pack 458 or pool 459 such that the sequence of virtual tickets dispensed for play would be unknown to anyone; however, since each shuffled virtual instant ticket 451 would still only be played once, the total amount of prizes awarded would still be as planned.

In an alternative embodiment, the pack 458 or pool 459 of virtual tickets 451 downloaded to the secure gambling microprocessor 100' would only embody prize awards for any conceivable denomination (e.g., "$1, $2, $3, . . . $52, $53, $54, . . . $107, $108, $109, . . . ") that could be won by a consumer playing a series of games where the winning or losing status was determined by the secure gambling microprocessor's 100' RNG 103'. Thus, with this alternative embodiment, the instant ticket provider 476 would only generate instant tickets used for cashing out winnings with the legacy lottery central site 477 system. This embodiment having the advantages of reduced compliance with United States banking laws as well as retaining the lottery's brick and mortar retailer network with the associated political benefits of supporting local (to the lottery's jurisdiction) commerce, while at the same time enabling essentially portable slot machine type gaming.

As is apparent to one skilled in the art, the instant ticket data simply provides a game outcome that can be validated on a legacy instant ticket system and only provides an outcome prize value (if any) with not necessarily any impact on game type, game play, or number of plays. Game play interaction, graphics, and style being preferably handled by the associated computing device 201' with the secure gambling microprocessor 100' simply determining the game's outcome either by the virtual ticket 451 pulled off of the stack or by the internal RNG 103'. The essential concept being that the gambling system remains secure from malicious hacking or manipulation with all win or lose gaming decisions performed by the secure gambling microprocessor 100' while still maintaining a highly desirable feature of enabling offline gameplay As previously discussed in FIG. 4A, each instant ticket's 451 inventory control (454 through 457) and validation information has a corresponding entry in the ship 460 and validation file 461 that identifies the ticket's 451 status (e.g., activated, stolen) in the ship file 460 and its winning or non-winning value in the validation file 461. As illustrated in FIG. 4B the ship 460' and validation 461' files are generated by the instant ticket provider 476 at the time of game generation where winning values are pseudorandomly assigned to inventory and validation codes 478. Thus, downloaded virtual instant tickets 451, packs 458, and pools 459 statuses can be tracked by the lottery central site 477 throughout the secure gambling microprocessor's 100' lifecycle. Among enhanced security and other features, this tracking process also allows the secure gambling microprocessors 100' to be placed on sale within easy reach of the consumer (e.g., on display pegs in an aisle) since the secure gambling microprocessor 100' would be essentially worthless unless its downloaded virtual instant ticket 451, pack 458, or pool 459 has been registered as activated on the lottery central site 477 ship 460" and validation 461" files. With activation of the associated virtual instant ticket 451, pack 458, or pool 459 only occurring at the time of sale shoplifting of the secure gambling microprocessors 100' would offer no economic gain and indeed the secure gambling microprocessors 100' could even be given away to the consumer with the consumer only paying for virtual instant tickets 451, packs 458, or pools 459 when they are downloaded to the device.

Account Value Unload

Figure 5:
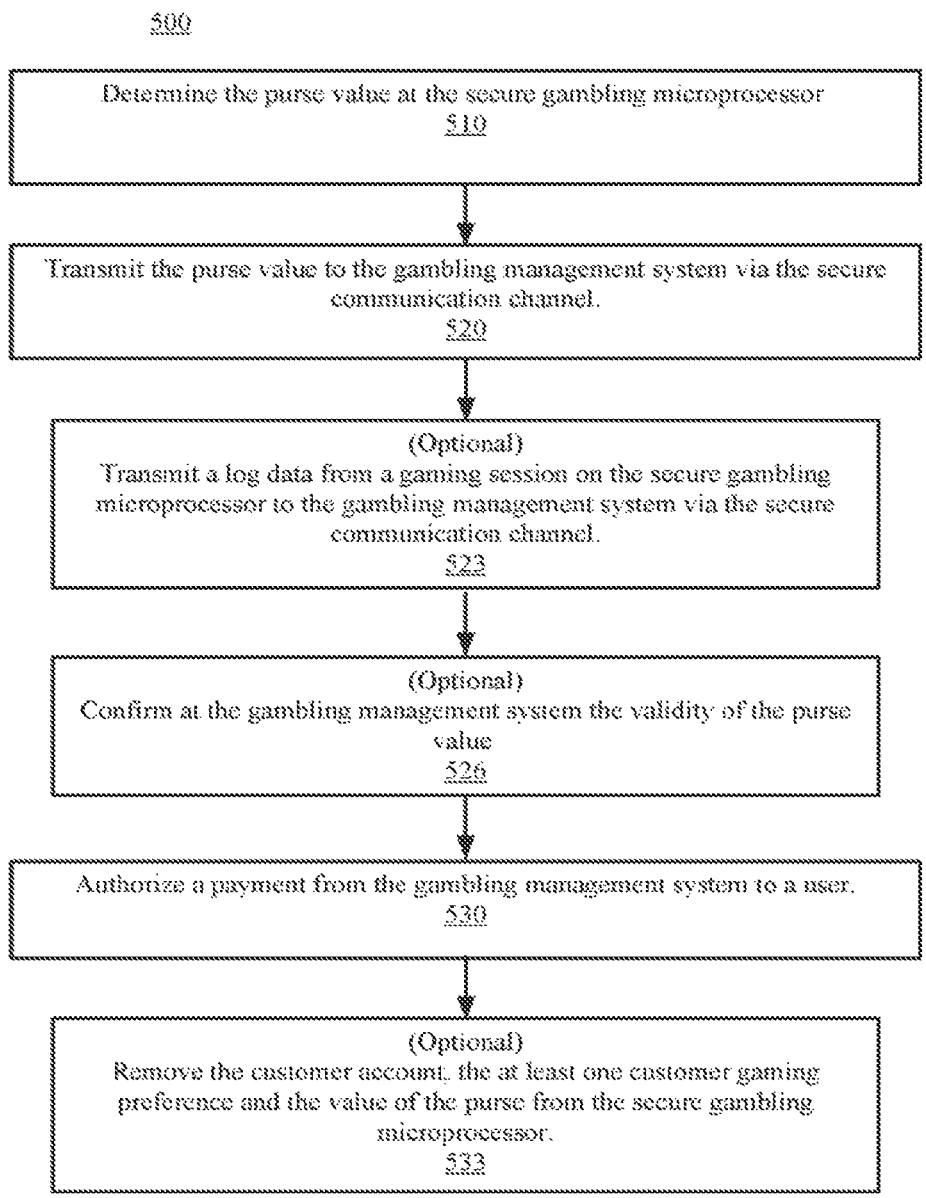
FIG. 5 is a flowchart for unloading of value and other data from a secure gambling microprocessor at the end of a gaming session in accordance with an embodiment.

Reference will now be made to FIG. 5, a flowchart 500 of a method of unloading the value or other data for the system in FIG. 2. In general, flowchart 500 may be utilized in a stand-alone format or may be used after one or more of flowcharts 300 and 400 described in FIGS. 3 and 4 respectively. At flowchart 500, a user decides to "cash out" from gaming, which entails transferring the value from the purse of secure gambling microprocessor 100 to the gambling management system 200.

In general, flowchart 500 is utilized when the user wants to cash out the purse. In general, the user would utilize the computing device to initiate secure communications between gambling management system 200 and the blackjack secure gambling microprocessor 100 as described herein. Gambling management system 200 would determine the size of the purse and provide the funds from the purse to the user in one of a number of payment methods. For example, gambling management system 200 may deposit the funds back into the user's bank account; cut the user a check, or the like.

With reference now to 510 of FIG. 5 and FIG. 2, one embodiment determines the purse value at secure gambling microprocessor 100. For example, gambling management system 200 may automatically identify which secure gambling microprocessor 100 will have its value unloaded and the amount requested by the Customer to be unloaded. In another embodiment, a Casino or Lottery operator interacts with the management interface of the gambling management system 200 to identify which secure gambling microprocessor 100 will have its value unloaded and the amount requested by the Customer to be unloaded.

With reference now to 520 of FIG. 5 and FIG. 2, one embodiment transmits the purse value to gambling management system 200 via the secure communications channel 211. As described herein, in one embodiment the gambling management system 200 uses the secure gambling microprocessor 100 identifiers and internal systems such as the hardware security module to set up secure channel communication between the gambling management system 200 and secure gambling microprocessor 100.

With reference now to 523 of FIG. 5 and FIG. 2, one embodiment transmits the requested value unload along with optional log data from the gaming session back to the gambling management system 200. In addition, at 526 optional confirmation of the validity of the purse value is performed by gambling management system 200.

With reference now to 530 of FIG. 5 and FIG. 2, one embodiment authorizes payment from gambling management system 200 to the user. In addition, at 533, if the customer has completed gaming with secure gambling microprocessor 100, and the secure gambling microprocessor 100 belongs to the Casino, the Customer's account may also be removed from the secure gambling microprocessor 100 so that a different Customer may use it. In another embodiment, if the secure gambling microprocessor 100 belongs to the Customer, the account will remain on the secure gambling microprocessor 100 for future use.

In other words, the entire mobile device may be reusable. For example, a user may be at a casino and want to play blackjack in his room, at a lunch table, pool side, or the like, but may not have a computing device. The user would go to the cashier's cage and request a mobile device, such as a tablet or the like, with a secure gambling microprocessor 100 coupled therewith. The secure gambling microprocessor 100 on the mobile device would be loaded with the blackjack game and an amount of money added to the purse.

In addition, a mobile device may have more than one player's account thereon. For example, a first user may have an account on a secure gambling microprocessor 100 on a mobile device that includes a number of games and a purse. In addition, a number of additional users may also have an account on the same secure gambling microprocessor 100 on the same mobile device. For example, a first user has his own login to his account and has a purse with a 5,000.00 dollar value. A second user also has her own login to her account on the same device with the same secure gambling microprocessor 100 and she has a purse with a 25,000.00 dollar value. An $n^{th}$ user also has a login to an account on the same device with the same secure gambling microprocessor 100 and has a purse with a 2,000.00 dollar value.

In another embodiment, the games may also be different for one or more user's account on the same device with the same secure gambling microprocessor 100. For example, the first user may only have a blackjack game, the second user may only have a roulette game, and the nth user may have access to a number of games.

The user would then take the mobile device to his room or other location, and play blackjack. When the user was done playing, he would return the mobile device to the cashier's cage. At that time, the blackjack secure gambling microprocessor 100 would communicate with the gaming management system to determine the value of the user's purse. In one embodiment, the determining would also include the gaming management system ensuring the security of the blackjack secure gambling microprocessor 100 and the purse contents thereon. If the user had money in the purse, the user would be paid.

In one embodiment, after the mobile device was returned and the user paid, the secure gambling microprocessor 100 would be returned to default and the mobile device would await the next user.

Figure 5A:
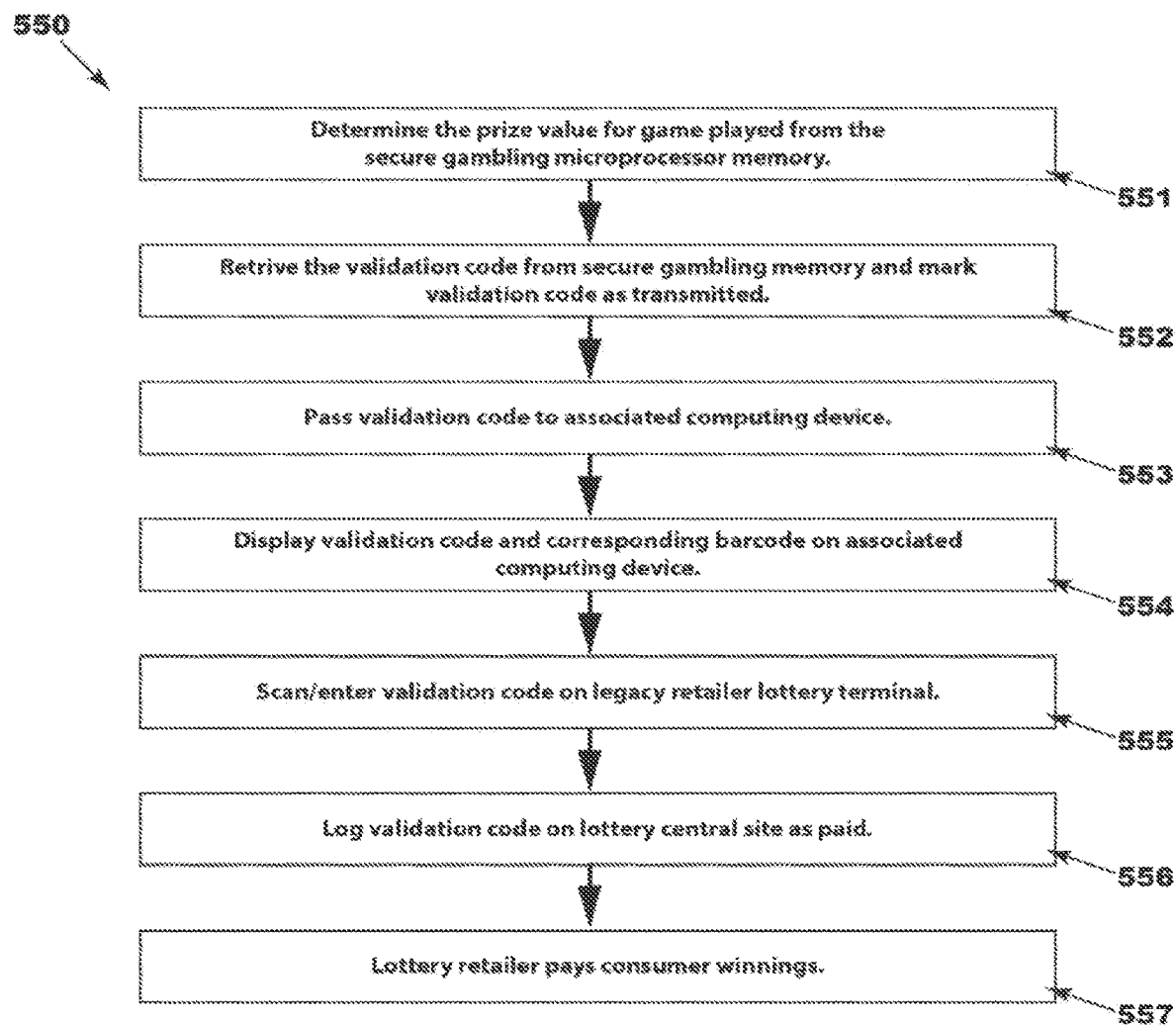
FIG. 5A is a flowchart for unloading of value and other data from a secure gambling microprocessor at the end of a gaming session to a prior art (legacy) lottery instant ticket validation system in accordance with an embodiment; and, FIG. 5B is a flowchart for unloading of value and other data from a secure gambling microprocessor at the end of a gaming session to a prior art (legacy) lottery instant ticket validation system where winning or losing status was determined by a local Random Number Generator (RNG) local to the secure gambling microprocessor that is in accordance with an embodiment.

With reference now to 550 of FIG. 5A and FIG. 4A, and FIG. 4B, one embodiment determines the prize value at secure gambling microprocessor 100' wherein the payout for a predetermined game occurs in conjunction with a legacy lottery central site 477 system. As shown in FIG. 5A, the payout process starts at the conclusion of a winning game that outcome was predetermined by a virtual instant ticket 451 downloaded to the secure gambling microprocessor 100' when the prize value for the winning game previously played is retrieved from EEPROM 108' memory 551. Next, the secure gambling microprocessor 100' notates in its memory that the virtual instant ticket 451 has been successfully played with its validation code transmitted (552 and 553) to the associated computing device 201'. The associated computing device 201' then displays the validation code 554 both in a human readable form and in a barcode format that is compatible with legacy lottery terminal scanners. If the associated computing device 201' is a desktop computer or some other non-portable device, the validation code may be printed with the hardcopy presented for validation.

When the validation code is presented for redemption at a legacy lottery retailer the validation code is keyed into the terminal by the retailer or preferably scanned in by decoding the validation barcode 555. The validation code is transmitted to the legacy lottery central site 477 where the code is verified with the ship 460" and validation 461" files to ensure that it represents a legitimate winner, the winning amount, has not been previously redeemed, and that the virtual instant ticket 451 is from an activated pack 458 that has not been stolen. Assuming the validation code passes all required tests at the central site 477, it is logged as paid 556 with a message is transmitted back to the retailer instructing him or her to pay the consumer the winnings 557. Thus, even though the actual gaming portions were maintained as a virtual instant ticket embodied in the secure gambling microprocessor 100' with the game itself being a video interactive experience, the resulting winnings are paid via legacy lottery systems by an authorized lottery retailer.

As an alternative to cashing out, the consumer has the option to use his or her winnings to purchase additional plays on the gaming environment with the winnings. In this embodiment, the consumer would elect to roll over his or her winnings into new game play. The logistical tracking of the purchasing of additional plays would be maintained by either the purse management module 220' (FIG. 4B) or entirely within the EEPROM 108' of the secure gambling microprocessor 100'.

Figure 5B:
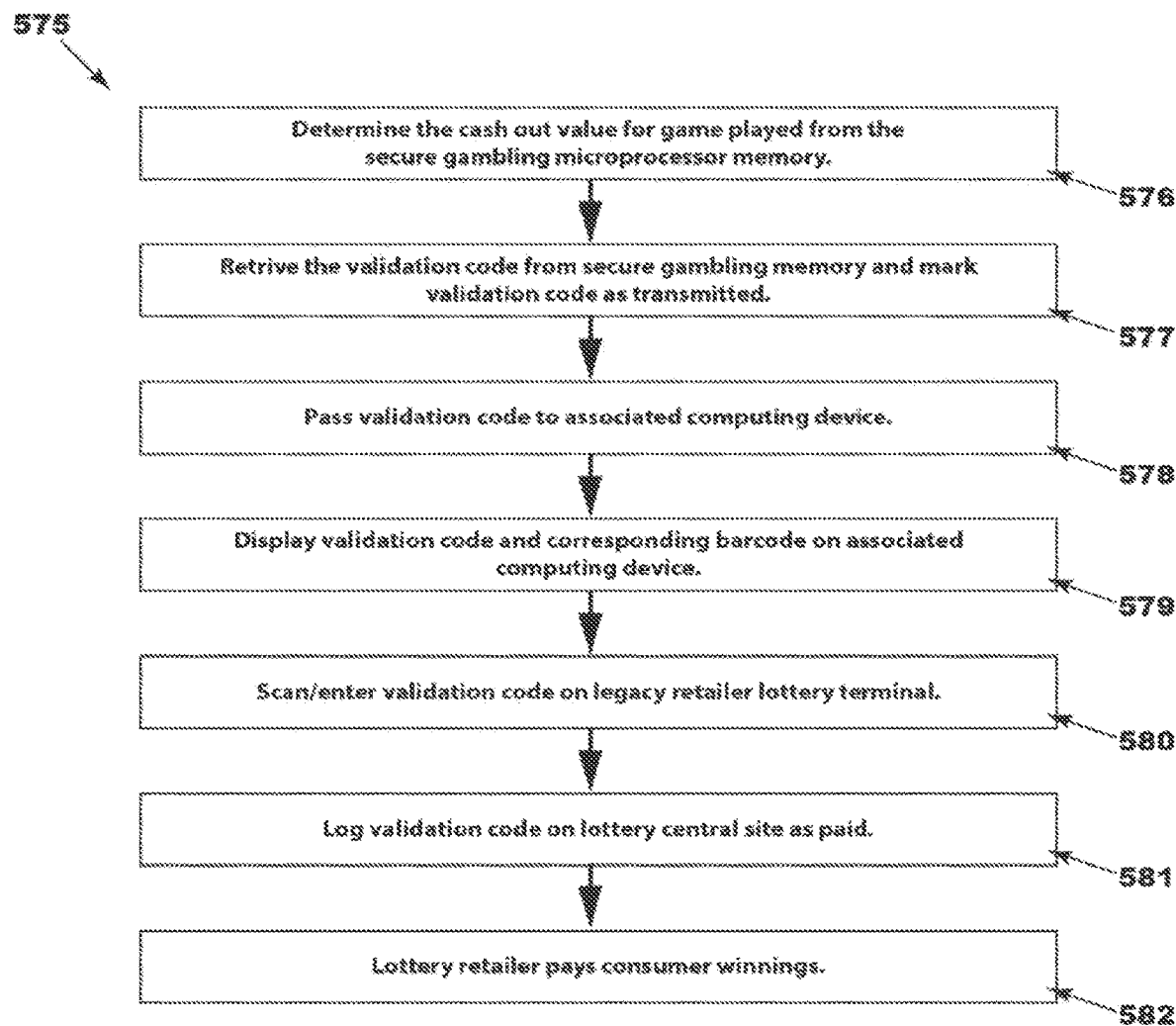

With reference now to 575 of FIG. 5B and FIG. 4A, and FIG. 4B, another embodiment determines the payout value at secure gambling microprocessor 100' wherein the payout may be an accumulation of multiple plays (e.g., determined by RNG 103') in conjunction with a legacy lottery central site 477 system. As shown in FIG. 5B, this embodiment 575 is virtually identical to the previous embodiment (550) with the exception of the initial step 576. With embodiment 575, the consumer elects to cash out 576 at any given time; hence the consumer's total prize winnings can be a variable between a minimum value (e.g., $1) and some theoretical maximum value (e.g., $500). Thus, to enable validations and redemptions on a legacy lottery instant ticket system 477, a virtual pack 458 or pool 459 would have been downloaded to the secure gambling microprocessor 100' before the redemption process begins. This virtual pack 458 or pool 459 would embody an array of virtual instant tickets 451 with each ticket awarding a different prize level in the predefined range (e.g., ticket "001" pays $1, ticket "002" pays $2, ticket "003" pays $3 . . . ) such that there would be one validation code associated with a virtual pack 458 or pool 459 that would equate to the payout value at the time the consumer elected to cash out. Therefore, the lottery central site 477 would process one validation per pack 458 or pool 459 that would provide the proper payout value to the consumer. Of course in this embodiment 575, the vast majority of virtual instant tickets 451 would never be validated, but since the tickets are virtual and only exist as reprogrammable bits in the secure gambling microprocessor's 100' EEPROM 108' memory there is virtually no cost associated with generating a large number of unused tickets. To allow for multiple validations and redemptions that could potentially have the same prize value more than one virtual pack 458 or pool 459 could be downloaded to the secure gambling microprocessor's 100' EEPROM 108' memory at a time. The remainder of the validation and redemption process for embodiment 575 is identical to embodiment 550.

After the cash out value has been determined the secure gambling microprocessor 100' notates in its memory that the virtual instant ticket 451 has been successfully played with its validation code transmitted (577 and 578) to the associated computing device 201'. The associated computing device 201' then displays the validation code 559 both in a human readable form and in a barcode format that is compatible with legacy lottery terminal scanners. If the associated computing device 201' is a desktop computer or some other non-portable device, the validation code may be printed with the hardcopy presented for validation. When the validation code is presented for redemption at a legacy lottery retailer the validation code is keyed into the terminal by the retailer or preferably scanned in by decoding the validation barcode 580. The validation code is transmitted to the legacy lottery central site 477 where the code is verified with the ship 460" and validation 461" files to ensure that it represents a legitimate winner, the winning amount, has not been previously redeemed, and that the virtual instant ticket 451 is from an activated pack 458 that has not been stolen. Assuming the validation code passes all required tests at the central site 477, it is logged as paid 580 with a message transmitted back to the retailer instructing him or her to pay the consumer the cash out winnings 582.

In one embodiment, the Lottery Central Site 477 notifies the Management System 200' of all interactions involving individual secure gambling microprocessors 100' so that the Management System 200' can stay synchronized with the Lottery Central Site 477 and the Management System 200' can opportunistically perform additional operations with the secure gambling processor 100' by using the Computing Device 201' to relay messages to the secure gambling processing 100' from time to time. One example of such opportunistic operations would be to send a message to the secure gambling microprocessor 100' that confirms that specific winning tickets have been redeemed. This communication does not provide any additional security advantage over the processes previously described, but it does enable the Computing Device to communicate with the secure gambling microprocessor 100' and display in the Graphical User Interface of the Computing Device 201', the state of which winnings have been redeemed and to allow an update message from the Management System 200' to be received by the secure gambling microprocessor 100' indicating which specific winnings have been redeemed.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method of allowing a plurality of consumers to play a set of virtual instant tickets via a plurality of microprocessors, each virtual instant ticket having a predetermined winning or losing outcome, a value for any winning outcome, and also having a predefined cost for ticket play, the method comprising:
   (a) loading a plurality of virtual instant tickets from the set of virtual instant tickets to a memory of one of the plurality of microprocessors by loading information for each virtual instant ticket including:
      (i) a validation number of the virtual instant ticket, wherein the validation number is obtained from a preexisting validation file, and
      (ii) the winning or losing outcome of the virtual instant ticket and the value of any winning outcome, wherein the plurality of virtual instant tickets are loaded to the memory of the microprocessor prior to any purchasing by one of the plurality of consumers of ticket play for any of the plurality of virtual instant tickets;
   (b) prior to ticket play, physically providing the microprocessor loaded with the plurality of virtual instant tickets to one of the plurality of consumers so that the consumer is in physical possession of the microprocessor;
   (c) purchasing a predefined monetary amount of ticket play that allows the consumer to play a portion of the plurality of virtual instant tickets that corresponds to the cost for ticket play for that portion of the plurality of virtual instant tickets, the portion being less than all of the virtual instant tickets that were previously loaded to the memory of the microprocessor;
   (d) initiating communication between the microprocessor and a computing device operated by the consumer that is configured to play one or more of the virtual instant tickets that are in the memory of the microprocessor;
   (e) playing the one or more virtual instant tickets via interaction of the microprocessor and the computing device and displaying the winning or losing outcome on a display of the computing device;
   (f) updating the memory of the microprocessor to indicate the one or more virtual instant tickets that were played in step (e),
      wherein the one or more played virtual instant tickets remain in the memory of the microprocessor after being played; and
   (g) redeeming the value of any winning virtual instant tickets by communicating the validation number for the winning virtual instant ticket from the memory of the microprocessor to an instant ticket validation and redemption system that has knowledge of the validation number for each virtual instant ticket for performing validation, wherein the validation number is a static number, and wherein each of the plurality of consumers is physically provided with their own respective microprocessor to perform steps (b)-(e), each of the respective microprocessors operate independently from each other, and each of the respective microprocessors is loaded with a different plurality of virtual instant tickets from the set of virtual instant tickets.

2. The method of claim 1 wherein the plurality of virtual instant tickets are associated with a pool of instant tickets.

3. The method of claim 2 wherein the plurality of virtual instant tickets are associated with a pack of instant tickets within the pool of instant tickets.

4. The method of claim 1 wherein each of the microprocessors includes a Random Number Generator, and wherein the plurality of virtual instant tickets have an initial play sequence, the method further comprising:

(h) the Random Number Generator (RNG) generating an output; and (i) shuffling the initial play sequence using the generated output of the RNG, thereby rearranging the initial play sequence.

5. The method of claim 1 further comprising prior to step (a):

(h) embedding each of the microprocessors within a bank card or hotel room key card which is provided to the consumer.

6. The method of claim 1 wherein the communication in step (d) occurs via contactless communication.

7. The method of claim 1 wherein the plurality of virtual instant tickets are lottery tickets.

8. The method of claim 1 wherein the computing device is selected from the group consisting of: mobile phones, tablet computers, laptop computers, notebook computers, and personal digital assistants.

9. The method of claim 1 wherein each of the microprocessors is in a form factor selected from the group consisting of: smart cards, secure digital flash memory cards, and Subscriber Identity Module (SIM) cards.

10. The method of claim 1 wherein a remaining portion of the plurality of virtual instant tickets that were previously loaded to the memory of the microprocessor remain available to be played at a later point in time upon making a subsequent purchase to play an additional portion of the plurality of virtual instant tickets, the method further comprising:

(g) making a subsequent purchase of a predefined monetary amount of ticket play that allows the consumer to play an additional portion of the plurality of virtual instant tickets in the remaining portion.

11. A distributed gaming system that allows a plurality of consumers to play a set of virtual instant tickets, each virtual instant ticket having a predetermined winning or losing outcome, a value for any winning outcome, and also having a predefined cost for ticket play, the distributed gaming system comprising:

(a) a plurality of microprocessors that are located with the plurality of consumers prior to ticket play, each of the microprocessors including a memory, each of the microprocessors being configured to:

(i) load a plurality of virtual instant tickets from the set of virtual instant tickets to the memory by loading information for each virtual instant ticket including:

(A) a validation number of the virtual instant ticket, wherein the validation number is obtained from a preexisting validation file, and (B) the winning or losing outcome of the virtual instant ticket and the value of any winning outcome, wherein the plurality of virtual instant tickets are loaded to the memory of the microprocessor prior to any purchasing by one of the plurality of consumers of ticket play for any of the plurality of virtual instant tickets, (ii) unlock a portion of the plurality of virtual instant tickets, thereby allowing the consumer to play the unlocked portion of the plurality of virtual instant tickets, the unlocking occurring as a result of purchasing a predefined monetary amount of ticket play that corresponds to the cost for ticket play for that portion of the plurality of virtual instant tickets, the portion being less than all of the virtual instant tickets that were previously loaded to the memory of the microprocessor, wherein a remaining portion of the plurality of virtual instant tickets that were previously loaded to the memory of the microprocessor remain available to be played at a later point in time upon making a subsequent purchase to play an additional portion of the plurality of virtual instant tickets, and (iii) unlock the additional portion of the plurality of virtual instant tickets in the remaining portion as a result of a subsequent purchase of a predefined monetary amount of ticket play that allows the consumer to play the additional portion of the plurality of virtual instant tickets in the remaining portion; and (b) a plurality of computing devices, each computing device being in communication with a respective microprocessor, each computing device being operated by one of the consumers, each computing device being configured to:

(i) play one or more of the virtual instant tickets that are in the memory of the respective microprocessor via interaction of the respective microprocessor and the computing device, and (ii) display the winning or losing outcome on a display of the computing device; and wherein the respective microprocessor is further configured to:

(iii) update the memory of the respective microprocessor to indicate the one or more virtual instant tickets that were played, wherein the one or more played virtual instant tickets remain in the memory of the microprocessor after being played, and wherein each of the microprocessors are further configured to:

(iv) redeem the value of any winning virtual instant tickets by communicating the validation number for the winning virtual instant ticket from the memory of the microprocessor to an instant ticket validation and redemption system that has knowledge of the validation number for each virtual instant ticket for performing validation, wherein the validation number is a static number, and wherein each of the respective microprocessors operate independently from each other, and each of the respective microprocessors is loaded with a different plurality of virtual instant tickets from the set of virtual instant tickets.

12. The distributed gaming system of claim 11 wherein the plurality of virtual instant tickets are associated with a pool of instant tickets.

13. The distributed gaming system of claim 12 wherein the plurality of virtual instant tickets are associated with a pack of instant tickets within the pool of instant tickets.

14. The distributed gaming system of claim 11 wherein each of the microprocessors further includes a Random Number Generator (RNG) that generates an output, and wherein the plurality of virtual instant tickets have an initial play sequence, the microprocessor being further configured to:
　(v) shuffle the initial play sequence using the generated output of the RNG, thereby rearranging the initial play sequence.

15. The distributed gaming system of claim 11 wherein each of the microprocessors is embedded within a bank card or hotel room key card of a consumer.

16. The distributed gaming system of claim 11 wherein the communication between the computing device and the microprocessor occurs via contactless communication.

17. The distributed gaming system of claim 11 wherein the plurality of virtual instant tickets are lottery tickets.

18. The distributed gaming system of claim 11 wherein the computing device is selected from the group consisting of: mobile phones, tablet computers, laptop computers, notebook computers, and personal digital assistants.

19. The distributed gaming system of claim 11 wherein each of the microprocessors is in a form factor selected from the group consisting of: smart cards, secure digital flash memory cards, and Subscriber Identity Module (SIM) cards.

* * * * *